Feb. 1, 1938.  C. C. WHITTIER  2,106,779
METHOD AND MEANS FOR PRODUCING VITAMIN D
Filed May 2, 1934
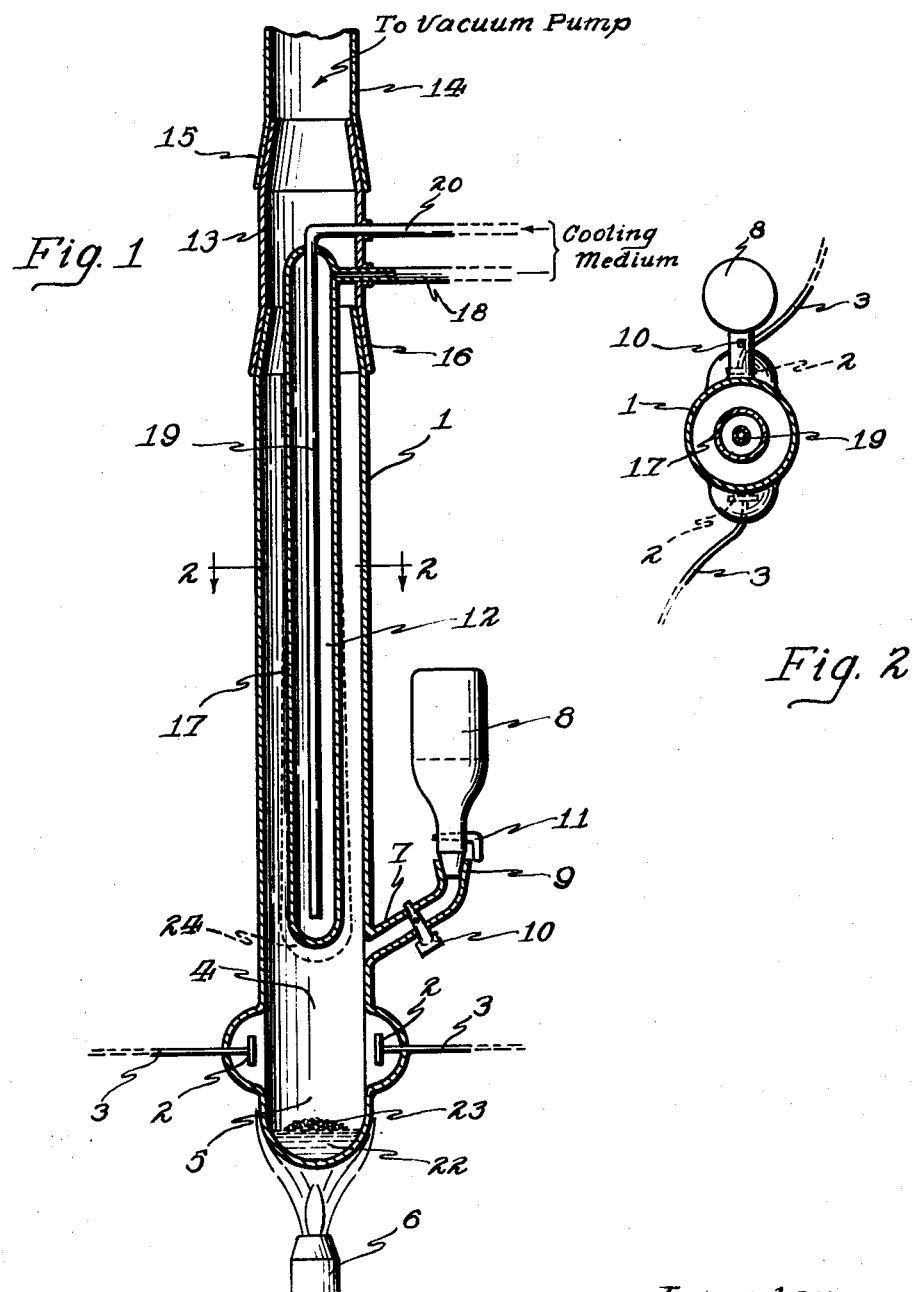
Inventor
Charles C. Whittier, Patented Feb. 1, 1938

2,106,779

UNITED STATES PATENT OFFICE 2,106,779

METHOD AND MEANS FOR PRODUCING VITAMIN D

Charles C. Whittier, Chicago, Ill.

Application May 2, 1934, Serial No. 723,495

3 Claims. (Cl. 204—31)

This invention relates to the production of vitamin D in concentrated form and particularly to certain improvements in the method of manufacture and apparatus described in my co-pending application Serial No. 711,539 filed February 16, 1934.

The methods of obtaining vitamin D that have heretofore been most commonly employed consist either in concentrating certain ingredients of natural substances containing naturally produced vitamin D, or in artificially producing the characteristics or qualities known as vitamin D by exposing appropriate substances in liquid or solid form to the action of ultra-violet rays, which latter procedure is commonly called irradiation. Investigation and the study of the substances having the properties known as vitamin D substantially supports the theory that this vitamin is chemical in its nature and that its properties are due to its molecular and atomic structure, such for example, as a rearrangement of the position of hydrogen in a hydroxy group of elements due to a shift in the position of certain bonds of valency in the molecular grouping, or a rearrangement of the electrons of the atomic structure.

It is well known that sunlight is responsible for or largely influential in the operation of many plant and animal life processes. Vitamin D has frequently been referred to as the "sunshine vitamin" because of the fact that it has the capacity of preventing and curing the disease of rickets which disease has been ascribed to conditions resulting from an inadequate exposure to sunshine; or an insufficiency of certain foods containing vitamin D. It is also known that most materials which receive antirachitic activation from exposure to sunlight contain a substance known as ergosterol which is accordingly looked upon as the parent substance of vitamin D.

The experiments and discoveries upon which this application is based have been mainly directed to producing the vitamin D qualities in ergosterol which is readily obtainable from plant and animal sources and which is not of itself antirachitically activated. As is well known, there are many substances allied to or containing ergosterol that are capable of antirachitic activation. Therefore, in the following description and claims it is to be understood that the specific term "ergosterol" is not intended to restrict the scope of my invention to that substance, per se, but said term is intended to represent the entire class of activatable substances including for example, fats, lipins, sterols, cholesterol, zoosterols and phytosterol.

The main objects of this invention are to provide an improved method and means for producing a crystalline product containing vitamin D and highly potent as a means for producing antirachitic activation in foods and medicinal substances; and to provide an improved method of increasing the antirachitic potency of ergosterol products by activating the same in a vapor state in the presence of a catalyst.

Apparatus suitable for carrying out the herein-described method is illustrated in the accompanying drawing in which:

Figure 1 is a vertical section of a device designed for treating ergosterol in accordance with the present invention.

Fig. 2 is a transverse section taken on the line 2—2 of Fig. 1.

In the form shown, the tube 1 which may be of glass is equipped with electrodes 2 connected with an appropriate source of high tension electric current indicated by the conductors 3 for producing in the tube 1 an energized space 4 between said terminals. The lower end of the tube 1 is closed and forms a flask 5 and is associated with means for heating such flask represented by the burner 6.

Spaced above this flask portion of the tube 1 and communicating therewith is a supply tube 7 which is connected with a magazine 8 in the form of a bottle for holding the ergosterol or other raw material to be treated. The end of the tube 7 and the mouth of the bottle are tapered and ground to form an air-tight joint 9. Pet cock valves 10 and 11 are provided in the tube 7 and the neck of the bottle 8 for controlling or cutting off the flow of material.

Extending into the upper portion of the tube 1, above the terminals 2, is a condenser 12 which is preferably carried by a tube section or fitting 13 by means of which the tube is connected to a vacuum pump line member 14, by means of which the tube 1 is exhausted. The tube 1 and the fitting 13 may be made of glass or other suitable material and the joints 15 and 16 are accordingly ground and tapered so as to be tight and at the same time convenient for connection and disconnection.

The drawings are diagrammatic to the extent of illustrating the essentials of the apparatus and omitting the supporting frame which may be any suitable arrangement of supports with clamps for removably holding the tube sections.

The condenser may be made of an outer tube 17 closed at the bottom and having an outlet duct 18 at the top, and an inner tube 19, open at the bottom, having a branch 20 at its upper end, extending outwardly through the top of tube 17 and the fitting 13. The tubes 18 and 20 are connected to a water service pipe or other source of cooling medium 21, whereby a cooling agent, such as water, may be circulated through the condenser.

In carrying out my improved method, I place a quantity of the metal indium 22 in the flask 5 at the lower end of the tube and connect the various parts of the tube together and to the vacuum pump, as illustrated in Figure 1. The vacuum pump is then operated and the tube maintained in an exhausted condition. I then apply heat to melt the indium by means of the burner 6. The melting point of indium is 155° C. and it is maintained in molten condition far below its boiling temperature of 1,450° C.

The space 4 between the terminals 2 is then energized by passing an electric current through it in the usual way. An A. C. current of 5 milliamperes at 100,000 volts and a frequency of 1,300 kilocycles is suitable for this purpose. Appropriate energizing of the interior of the tube for the manufacture of vitamin D from ergosterol by the herein-described method may also be accomplished by the arrangements described in my said co-pending application, Serial No. 711,539, wherein alternative arrangements of the parts are shown in one instance for directing the discharge along the tube 1 by placing the electrodes in longitudinally spaced arrangement, and another instance in which the activating influence is produced by a winding around the outside of the tube.

After the indium is in a liquid state and the tube energized, a quantity of ergosterol 23 is dropped upon the molten indium from bottle 8 and is evaporated, the temperature of the molten indium being above the boiling point of ergosterol, which is below 200° C.

The solid ergosterol rests on the surface of the molten indium for a few seconds, melts and vaporizes while absorbing the radiations emitted by the indium radiator, while the ergosterol is in the solid, liquid and vapor states. The slowly rising vapor leaves the zone of maximum indium activation and enters the zone of electrically induced activation, passing upward to the cooling zone around the condenser 12. The vapor concentrated on the surface of the cooler 12 is a new solid form. No material passes beyond the condenser or is collected elsewhere in the apparatus; all of the material entering the tube at 7 is recovered in a new solid form on the condenser and contains the vitamin D substance or characteristics ready for practical use.

This method of operation is continued upon repeated charges of ergosterol until a considerable deposit has accumulated upon the surface of the condenser. This deposit is thick at the lower end of the condenser and tapers to practically nothing at the top indicating that all of the vaporized ergosterol is condensed and deposited on the exterior of the condenser. The operation is discontinued when the upper edge of the deposit reaches the vicinity of the upper part of tube 17. It is my practice to continue the operation of the vacuum pump throughout the entire process for the purpose of maintaining an appropriate vacuum and there is no appreciable loss of the treated product by escape into the vacuum pump or elsewhere in the apparatus.

The indium acts as a radiator of energy for evaporating and treating the ergosterol and though it has a discharge directed toward the space 4, there is no appreciable loss of weight of the indium over a considerable period of operation. I find, however, that the indium emanation exercises a profound influence upon the ergosterol in that it greatly enhances the antirachitic potency of the converted ergosterol. This appears to be due to a catalytic action since there is no indium in the resulting product and the indium lasts indefinitely.

I find that the potency of the product made in the presence of the indium emanations is very considerably more than that of the product of the same ergosterol raw material treated by the process in the absence of the indium, all other conditions being the same.

After completing the operation, the flame of the burner 6 is extinguished, the electric current is cut off and the vacuum pump is stopped and the parts of the apparatus are allowed to cool to a temperature at which they can be handled; then tube 1 and fitting 13 are disconnected from the vacuum line and separated from each other and the crystals are scraped from the surface of the condenser 12 or are washed therefrom by dissolving them in ether and are recrystallized after evaporating the ether. I prefer to scrape the crystals from the surface of the condenser because they are then ready for use without any further treatment.

The crystals resulting from this process are quite different from those of the untreated ergosterol.

Although I am unable to explain at this time the exact chemical difference, if any, between my product and an ergosterol product that is made by exposing the substance to ultra-violet light in accordance with the prior practice, I am convinced that my method has many features of substantial superiority over the ultra-violet light treatment of ergosterol. For example:—

First—My method is very rapid and very efficient as compared with the ultra-violet light treatment.

Second—In the ultra-violet ray methods of irradiation the quartz shell of the tube itself serves to intercept and absorb a considerable percentage of the energy of the discharge due to difference in the diameter, single and cluster groups of gas pockets, burning on of dirt, grease and other substances; whereas in my method the treatment of the vaporized ergosterol by the discharge between the electrodes in the space 4 completely avoids the losses due to physical defects, the filtering effect of the material of the tube, the intervening air space and the walls of the container of the material subjected to ultra-violet ray treatment, by the usual methods of irradiation.

Third—Measured by antirachitic potency as assayed according to the established standard tests of antirachitic effect upon the standard white rat, the product of my herein-described process has a high degree of vitamin D content and produces a cure as required by the League of Nations standard defined in its publication Official No. C. H. 1056 (1), Geneva, 1931, London, June 23rd, 1931) as follows:

"(e) Definition of Unit.

"The unit of Vitamin D recommended for adoption is defined as the Vitamin D activity of 1 mg. of the international standard solution of irradiated ergosterol.

"Note.—The international standard solution has been prepared to have such potency that approximately 1 mg. thereof given daily to a rachitic rat for eight successive days will produce a wide line of calcium deposits in the metaphysis of the proximal ends of the tibiae and of the distal ends of the radii."

Although but one specific embodiment of this invention has been herein shown and described, it will be understood that details of the method and construction illustrated may be modified or omitted without departing from the spirit of my invention as defined by the following claims.

I claim:

1. The method of producing vitamin D characteristics in ergosterol, which consists in vaporizing the ergosterol on a heated mass of indium and passing the vapor through a zone of antirachitically activating electrical discharge in a vacuum.

2. The method of producing vitamin D, which consists in vaporizing a sterol and then passing it through a zone of electrically induced antirachitically activating discharge in a vacuum containing indium emanations.

3. The method of imparting antirachitical activation to ergosterol which consists in vaporizing the ergosterol and exposing the same directly to silent electrical discharge in a vacuum in the presence of an indium catalyst.

CHARLES C. WHITTIER.